United States Patent Office 3,374,185
Patented Mar. 19, 1968

3,374,185
ELECTROCONDUCTIVE COMPOSITION
CONTAINING BaPbO$_3$
Tsuneharu Nitta, Osaka-fu, Hiromitsu Taki, Sakai-shi, Osaka-fu, and Kaneomi Nagase, Kyoto-shi, Kyoto-fu, Japan, assignors to Matsushita Electric Industrial Co., Ltd., Osaka, Japan
No Drawing. Filed Sept. 15, 1965, Ser. No. 487,621
Claims priority, application Japan, Sept. 17, 1964, 39/53,652; Oct. 27, 1964, 39/61,377
4 Claims. (Cl. 252—521)

ABSTRACT OF THE DISCLOSURE

Ceramic materials composed essentially of barium oxide and lead dioxide have a low electrical resistivity with a small positive temperature coefficient, and are especially useful in the making of sintered resistors, particularly thin layer resistors. The barium oxide, as barium carbonate, is intimately admixed with PbO or Pb$_3$O$_4$ and fired (calcined) at 650–800° C., after which the calcined product is crushed and dried. In use, the product may be pelletized, or formulated for use in making resistors, by admixing with refractory oxide and then converting into paste form, or it may be admixed with inert resin of high electrical resistance and used in making thin layer resistors.

---

This invention relates to novel barium metaplumbate electroconductive ceramic materials corresponding to the formula BaPbO$_3$, to resistors comprising this novel material and to novel methods of making such materials.

An object of the invention is to provide novel electroconductive ceramic materials having a relatively low electric resistance and a small positive temperature coefficient of resistivity.

A further object of the invention is to provide resistors comprising this novel electroconductive compound.

A still further object of the invention is to provide a simple and economic method of making electroconductive ceramic materials characterized by a high resistance to mechanical abrasion, thermal shock, humidity, oxidation and reduction.

Such electroconductive ceramic materials are suitable for use in potentiometers and variable resistors as well as in fixed resistors.

Resistance elements have been made by winding metal wire or ribbon on nonconductive cores or cards. Such wound resistors are characterized by good stability and close control of resistance tolerances. However, such resistors are applicable only for use in relatively low ohmic resistance. Resistors have also been formed by applying thin metallic films to nonconductive base materials, such as by sputtering or evaporation techniques. Conducting metals with relatively low ohmic resistance, such as gold, platinum, palladium, nickel, etc., have been used in the manufacture of such resistors. These thin films deposited on insulating materials have inferior characteristics with regard to electrical loading, temperature variations and mechanical abrasion.

Low cost resisting elements are manufactured by depositing carbon or boro-carbon on nonconductive base materials. The electrical resistance of various forms of carbon is somewhat higher than that of the aforesaid various metal resistors. However, such deposited carbon resistance elements are not stable with temperature and voltage and have numerous surface irregularities which are undesirable for use in variable resistance elements.

Carbon-composition resistors formed by molding mixtures of carbon and resins are difficult to be applied for use at higher temperature and high electrical load and exhibit a relatively large noise resulting from non-ohmic contacts.

Furthermore, there have been disclosed many electroconductive ceramic materials, such as silicon carbide, conductive barium titanate, ceramic materials containing carbon powder or conductive metal powder such as nickel. However, these ceramic materials are not suitable for use in resistance elements because of large temperature coefficients of resistivity.

It is desirable that a resistance material for use in a resistance element exhibits a small noise, a high electric load, and a high stability with mechanical abrasion, thermal shock, humidity, oxidation and reduction.

In accordance with the present invention, it has been discovered that ceramic materials composed essentially of barium oxide and lead dioxide have a low electric resistivity with a small positive temperature coefficient. These components are intimately and homogeneously combined and fired in accordance with a schedule set forth hereinafter for production of a fired ceramic body. The present invention ceramic body is a cubic perovskite-type compound with $a_0$=4.265 A. (X-ray density=8.40 g./cm.$^3$) at room temperature, which is commonly designated "Barium metaplumbate, BaPbO$_3$." Electrical properties and sinterability of barium metaplumbate (BaPbO$_3$) strongly vary with its composition. The following compositions can be employed according to the invention:

| | Preferable molar percentages |
|---|---|
| BaO | 40 to 60 |
| PbO$_2$ | 40 to 60 |

A ceramic body in an equimolar composition of barium oxide and lead dioxide exhibits the lowest electric resistance. The electrical resistance of the compound increases with increasing amounts of barium oxide. The sintering temperature of the compound decreases with an increase in amounts of lead dioxide. The compositions containing more than 60 molar percent of lead dioxide exist in both phases of barium metaplumbate (BaPbO$_3$) and lead oxide (PbO) and can hardly exhibit the desirable electric characteristics. The compositions containing more than 60 molar percent of barium oxide partly produce barium orthoplumbate (Ba$_2$PbO$_4$) which prevents formation of an uniform texture in the fired body and results in a poor resistance to humidity, etc.

The electrical resistivity of the ceramic material of the present invention can be readily controlled by changing its composition, and in this way to obtain an electrical resistivity of from $10^{-4}$ ohm-centimeters to 10 ohmcentimeters with a small temperature coefficient less than 0.05 percentage per degree centigrade in a temperature range from $-100°$ C. to $+250°$ C. It is also a discovery of the present invention that the ceramic material according thereto is hard, durable, and resistant to mechanical abrasion, thermal shock, humidity, oxidation and reduction.

In preparing the electroconductive materials of the present invention, the lead oxide will be employed as litharge (PbO) or red lead (Pb$_3$O$_4$). The barium oxide can be introduced as barium carbonate (BaCO$_3$). A mixture in desirable proportions of barium carbonate and lead oxide, for example, it wet-mixed with water in a rubber-lined ball mill using agate pebbles. Ball milling times of 10 to 24 hours give an intimate homogeneous mixture. The resultant mixture is dried by heating at 100° C. The mixed powder is calcined in alumina crucibles in air or oxygen atmosphere at a temperature from 650° C. to 800° C. in particular, the formation of barium metaplumbate (BaPbO$_3$) is promoted by increasing the partial pressure of oxygen. Red lead (Pb$_3$O$_4$) as a starting material promotes the formation of barium metaplumbate (BaPbO$_3$). The resultant calcined materials are wet-crushed in said ball mill and dried. The resultant powder may be admixed with a small amount of an organic binder such, for example, as a dilute solution of polyvinyl alcohol. The organic binder enables the powder to be compacted, in a pellet forming machine, into pellets of desired size and shape. Good results have been obtained when pressures of from about 750 to 1000 kg./cm.$^2$ are applied to the powder. The pressed pellets are then sintered in air at a temperature from 900° C. to 1000° C. for a period of the order of 1 hour, while being supported on zirconia plates. These pellets are then treated to provide ohmic contacts at spaced portions thereof. A coating method employing an electrode material, for example, silver paint, is satisfactory.

Sintered resistors comprising this novel material can be prepared by a per se well known fabrication technique. The said material in powder form, if desired mixed with a refractory oxide such as $ZrO_2$ and $Al_2O_3$, is pressed into desired form and fired in air. It is also possible to make a sintered thin layer resistor. The material powder with or without organic binder is mixed with a vehicle for producing a paste. The paste is coated onto an insulating ceramic material by brush, spray or stencil method, dried and sintered at 900° C. to 1000° C. During the drying and sintering, the organic binder and vehicle evaporate off. The electric resistance of a so-produced thin layer is controlled by its thickness. The composition of the thin layer can be modified by addition of refractory oxide.

As with usual carbon-composition resistors, the new material powder in a preferable particle size is admixed intimately with an inert resin (such as xylene resin, epoxy resin and phenol resin) having a high electrical resistance, molded into a given shape and cured by a conventional method. The weight proportion of the novel powder to resin is controlled depending upon the electric resistance of the finally fabricated body. The following proportions can be employed:

|  | Operable weight percentages | Preferable weight percentages |
| --- | --- | --- |
| $BaPbO_3$ powder | 95 to 40 | 90 to 70 |
| Resin | 5 to 60 | 10 to 30 |

The novel material powder can be fabricated into thin layer resistors by coating onto an insulating material such as resin, glass and ceramics. The powder and resin in a solvent are mixed for producing paste in any manner, for example, in a ball mill. Any solvent may be employed for this purpose, for example, benzol, pine oil, alpha-terpineol and beta-terpineol. The solvent evaporates off after curing of the resin. The paste is coated onto the aforesaid insulating material. It is required for obtaining a reliable resistance that the surface of insulating material be free from damage and be smooth. The viscosity of the paste depends upon the coating method and is controlled by the particle size of the powder, the weight proportion of the powder to resin and the amount of solvent. The paste may be coated onto an insulating material by a stencil, spray or brush method in per se known manner. Weight proportions of the novel powder to resin in thin layer resistors are desirable to be essentially the same as those of composition-resistors as described in the preceding table.

The particle size of the $BaPbO_3$, in producing a composition-resistor and thin layer resistor is desirably in a range of $0.5\mu$ to $10\mu$. Finely divided powder can be obtained by grinding a fired body consisting of a desirable composition of BaO and $PbO_2$ defined in the preceding description. A suitable method for grinding is a mechanical grinding method comprising a ball-mill, stamp mill, filing machine, air mill or their combinations. The following examples illustrate the practice of the invention.

*Example 1*

Starting materials are barium carbonate and red lead ($Pb_3O_4$). These raw materials are admixed to give the ceramic compositions set forth in Table I:

TABLE I

| No. | Composition (molar percent) | | Sintering Temperature (° C.) | Porosity (percent) | Resistance at 25° C. (ohm-centimeter) | Temperature Coefficient of Resistivity (percent per degree centigrade) |
| --- | --- | --- | --- | --- | --- | --- |
|  | BaO | $PbO_2$ |  |  |  |  |
| 1 | 40 | 60 | 900 | 2.8 | $8.0 \times 10^{-4}$ | 0.044 |
| 2 | 43 | 57 | 900 | 3.0 | $6.7 \times 10^{-4}$ | 0.038 |
| 3 | 45 | 55 | 920 | 3.5 | $8.0 \times 10^{-4}$ | 0.036 |
| 4 | 48 | 52 | 920 | 4.2 | $7.8 \times 10^{-4}$ | 0.028 |
| 5 | 50 | 50 | 920 | 4.5 | $8.3 \times 10^{-4}$ | 0.032 |
| 6 | 52 | 48 | 930 | 4.5 | $5.2 \times 10^{-3}$ | 0.040 |
| 7 | 55 | 45 | 950 | 4.6 | $4.3 \times 10^{-2}$ | 0.042 |
| 8 | 56 | 44 | 950 | 4.8 | $7.0 \times 10^{2}$ | 0.048 |
| 9 | 58 | 42 | 970 | 5.6 | $5.1 \times 10^{0}$ | 0.050 |
| 10 | 60 | 40 | 1,000 | 6.0 | $1.2 \times 10^{1}$ | 0.043 |

These ingredients are wet-mixed in water in a rubber-lined ball mill for 24 hours. The resulting slurry is allowed to settle and the supernatant water is evaporated and the resulting mud is then dried at 100° C. in air. The mixed powder is calcined in alumina crucibles in oxygen atmosphere at 700° C. for 1 hour. The resultant calcined materials are wet-crushed in said ball mill and dried. The powder is admixed with an emulsion of polyvinyl alcohol in a proportion of 100 grams of the powder to 8 cc. of a 6 percent aqueous emulsion of polyvinyl alcohol. The powder mixture is then pressed at a pressure of 1000 kg./cm.$^2$ into disc pellets. The pellets are sintered in air at a temperature from 900° C. to 1000° C. for 1 hour, while being supported on zirconia plates. The resulting sintered disc bodies are then coated at both ends of each disc with silver paint. The ohmic resistance of the sintered bodies is measured over the temperature ranging from $-100°$ C. to 250° C. by the four-probe method. Examples of the sintering temperature, porosity and electroconductive properties are shown in the here-included tables, of which Table I gives the sintering temperature, porosity, the ohmic resistance at 25° C. and temperature coefficient of resistivity for typical compositions, and Table II gives the variation with temperature of the electrical resistance for three compositions of Table I. The room temperature resistance increases with an increase in mol proportion of barium oxide. By controlling the amount of the barium oxide, the resistance is variable at any resistance levels of from $10^{-4}$ ohm-centimeters to 10 ohm-centimeters. The materials indicate a small temperature coefficient of resistivity less than 0.05 percentage per degree centigrade. Furthermore, the materials exhibit a high density characterized by a porosity less than 6 percent and an uniform ceramic texture of from 3 to $6\mu$ of grain size so that the ceramic bodies are hard, durable and resistant to mechanical abrasion, thermal shock, oxidation and reduction. Moreover, the simple and economic method of making them is characterized by the fact that the sintering temperature of the present invention ceramic bodies is much lower than that of the well-known ceramic compositions.

TABLE II

| Temperature (° C.): | No. 5 | No. 7 | No. 10 |
|---|---|---|---|
| −100 | $8.3 \times 10^{-4}$ | $4.3 \times 10^{-2}$ | $1.2 \times 10^{1}$ |
| −50 | $8.3 \times 10^{-4}$ | $4.3 \times 10^{-2}$ | $1.2 \times 10^{1}$ |
| 0 | $8.3 \times 10^{-4}$ | $4.3 \times 10^{-2}$ | $1.2 \times 10^{1}$ |
| 50 | $8.3 \times 10^{-4}$ | $4.5 \times 10^{-2}$ | $1.2 \times 10^{1}$ |
| 100 | $8.5 \times 10^{-4}$ | $4.6 \times 10^{-2}$ | $1.2 \times 10^{1}$ |
| 150 | $8.6 \times 10^{-4}$ | $4.6 \times 10^{-2}$ | $1.3 \times 10^{1}$ |
| 200 | $8.8 \times 10^{-4}$ | $4.8 \times 10^{-2}$ | $1.3 \times 10^{1}$ |
| 250 | $9.2 \times 10^{-4}$ | $4.9 \times 10^{-2}$ | $1.4 \times 10^{1}$ |

*Example 2*

Sintered resistors can be prepared as follows:

Starting materials are the calcined powder of No. 5 composition in Table I described in Example 1 and alumina powder. The following proportions are employed:

| | Weight percentages |
|---|---|
| $BaPbO_3$ powder | 70 |
| $Al_2O_3$ | 30 |

The mixture is wet-mixed in said ball mill. The resultant mixture is dried by heating at 100° C. The powder is then pressed at a pressure of 1000 kg./cm.² into pellets of 5 mm. diameter and 15 mm. height. The pressed pellets are sintered in air at 980° C. for 1 hour. The sintered pellets are coated at both ends with silver paint. The room temperature resistance is $4.0 \times 10^3$ ohm-centimeters. The temperature coefficient of resistivity is 0.12 percent per degree centigrade.

*Example 3*

A composition-resistor is manufactured as follows, the $BaPbO_3$ being of the composition of No. 5 in Table I:

| | Weight percentage |
|---|---|
| $BaPbO_3$ powder | 80 |
| Xylene resin | 20 |

The materials are mixed by rolling on a hot mixing roll until the mixture acquires the proper plasticity. The mixture is then hot-pressed at a pressure of 100 kg./cm.² at 190° C. for 30 minutes into pellets of 5 mm. diameter and 10 mm. height. The room temperature resistance is $3 \times 10$ ohm-centimeters. The material indicates a small temperature coefficient of resistivity less than 0.1 percent per degree centigrade. Furthermore, the material is harder, more durable and more resistant to mechanical abrasion, humidity and oxidation than the well known carbon-composition resistors.

It will be understood that the present specification and tables are only illustrative and not limiting.

Having thus disclosed the invention, what is claimed is:

1. A resistor composition adapted to thin layer resistors or composition-resistors, consisting essentially of 95 to 40 weight percent of finely divided barium metaplumbate and 5 to 60 weight percent of a resin selected from the group consisting of xylene resin, epoxy resin and phenol resin, said metaplumbate being characterized by a low electric resistivity of $7.8 \times 10^{-4}$ to $1.2 \times 10$ ohm-centimeters and a small positive temperature coefficient of 0.028 to 0.048 percent per degree centigrade, and consisting essentially of 40 to 60 molar percent of barium oxide and 40 to 60 molar percent of lead dioxide.

2. A resistor composition adapted to thin layer resistors or composition-resistors, consisting of essentially 90 to 70 weight percent of finely divided barium metaplumbate and 10 to 30 weight percent of a resin selected from the group consisting of xylene resin, epoxy resin and phenol resin, said metaplumbate being characterized by a low electric resistivity of $7.8 \times 10^{-4}$ to $1.2 \times 10$ ohm-centimeters and a small position temperature coefficient of 0.028 to 0.048 percent per degree centigrade, and consisting essentially of 40 to 60 molar percent of barium oxide and 40 to 60 molar percent of lead dioxide.

3. A method of making an electroconductive ceramic material comprising mixing 40 to 60 molar percent of barium carbonate and 40 to 60 molar percent of lead monoxide, calcining said mixture in oxygen atmosphere at 650° C. to 800° C., thereafter cooling the resultant reaction product, pressure compacting the latter, sintering said material in air at a temperature of from 900° C. to 1000° C., and thereafter cooling said sintered body.

4. A method of making an electroconductive ceramic material comprising mixing 40 to 60 molar percent of barium carbonate and 40 to 60 molar percent of $Pb_3O_4$, calcining said mixture in oxygen atmosphere at 650° C. to 800° C., thereafter cooling the resultant reaction product, pressure compacting the latter, sintering said material in air at a temperature of from 900° C. to 1000° C., and thereafter cooling said sintered body.

References Cited

FOREIGN PATENTS 922,491    4/1963    Great Britain.

OTHER REFERENCES

Meller: Comprehensive Treatise on Inorganic and Theoretical Chemistry, vol. 7, p. 698.

LEON R. ROSDOL, *Primary Examiner.*

J. D. WELSH, *Assistant Examiner.*